Figure 1:
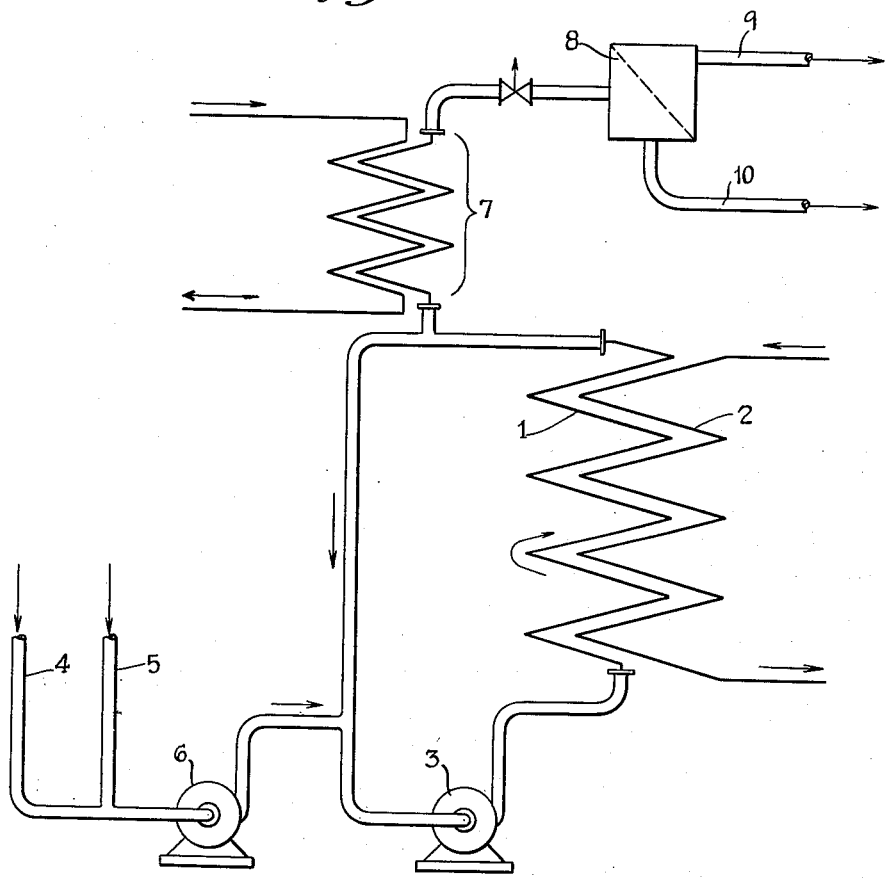

Sept. 3, 1957 P. BOURGUIGNON ET AL 2,805,246
STABILIZING ESTER PLASTICIZERS
Filed Sept. 19, 1955 2 Sheets-Sheet 1

INVENTORS.
PIERRE BOURGUIGNON.
PAUL BIARNAIS.
BY
Ward Neal Haselton Orme & McElhannon

ATTORNEYS.

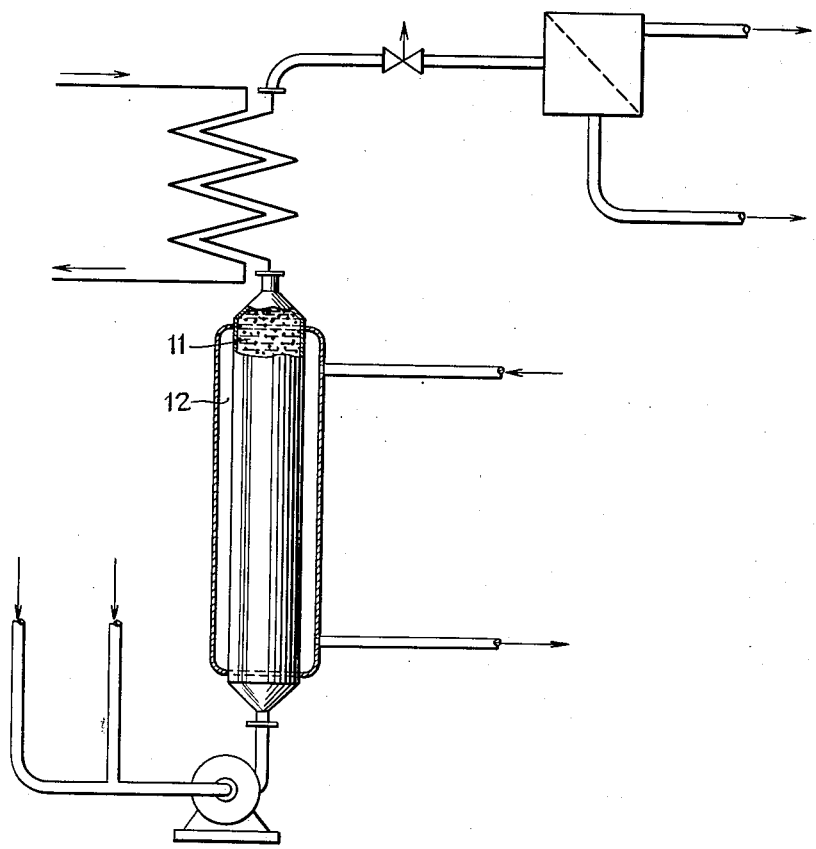

2,805,246

STABILIZING ESTER PLASTICIZERS

Pierre Bourguignon and Paul Biarnais, Melle, France, assignors to Les Usines de Melle (Societe Anonyme), Melle, France, a corporation of France Application September 19, 1955, Serial No. 535,229

Claims priority, application France September 30, 1954

3 Claims. (Cl. 260—475)

This invention relates to the purification of ester plasticizers which contain a strong acid radical derived from sulfuric or other strong acids.

Ester plasticizers for use with synthetic resins must withstand heat treatment during the manufacture of articles therefrom. Heating generally alters ester plasticizers and heated mixtures of such plasticizers with synthetic resins tend to darken or otherwise change color and to become acid. Heat stability tests for such plasticizers have, therefore, been established by manufacturers. Such tests are based upon determination of acidity and color developed by heating the plasticizer for a given time at a high temperature (usually 160–200° C. according to the test). Another test appearing in "Analytical Chemistry" published by The American Chemical Society, Easton, Pa., November 4, 1951, page 1692, requires heating of the plasticizer for a given time at high temperature with a piece of filter-paper immersed therein. The degree of discoloration of the filter-paper on such heating indicates the heat instability of the plasticizer.

Most plasticizers are esters and are produced by esterification in the presence of a strong acid catalyst such as sulfuric acid or sulfonic acids. After the continous or batch production of the ester, neutralization and other treatments thereof, such as washing, there is usually obtained an ester plasticizer meeting any and all requirements as to color and physical and chemical characteristics, but whose heat stability is low. On heating at a high temperature such as mentioned above, such material with a low heat stability, strong color and acidity develop therein. When such low stability material is tested with the filter-paper test, the filter-paper becomes dark colored.

The principle object of the invention accordingly is to provide a simple and efficient process for improving the heat stability of such plasticizers and to provide a satisfactorily stabilized product. The invention accordingly comprises the novel products as well as the novel processes and steps of processes according to which such products are manufactured, the specific embodiments of which are described hereinafter by way of example and in accordance with which we now prefer to practice the invention.

We have found in accordance with our invention that the heat instability of such ester plasticizers is due primarily to the presence in the ester of dialkyl sulfate or similar alkyl compound with a strong acid radical, which decomposes at high temperature, such as employed in molding, to liberate sulfuric acid. The acid then decomposes the ester giving acid and colored products. The acid products tend to deteriorate the resin and the colors produced, particularly dark colors, are usually objectionable.

In accordance with our invention, we heat a mixture of an ester containing an impurity having a strong acid radical in sufficient quantity to cause discoloration in heating of the ester, with an agent to render the liberated strong acid inactive. The impurity is, as pointed out above, a dialkyl sulfate or similar alkyl compound with a strong acid radical. This acid is sufficient to cause deterioration and discoloration of many synthetic resins when heated therewith. The agent for rendering the impurity inactive is preferably an aqueous salt of a weak acid, but may consist of other materials as discussed below. After treatment with the agent, the later with the inactivated impurity is separated from the ester.

The heat treatment of the ester according to this invention is preferably performed either in the presence of an aqueous solution of a soluble salt of a weak acid, such as aqueous sodium carbonate, or an alkaline hydroxide, or in the presence of a dry salt of a weak acid, such as sodium carbonate, or else in the presence of water, only. By the use of such salt or hydroxide, the sulfuric acid is neutralized as it is formed and may be removed. Where only water is used, the sulfuric acid as it is formed is dissolved by the water so that its strength becomes low enough to render it unable to attack the ester, then the aqueous acid is separated by decantation and the ester is finally neutralized to eliminate any traces of acid.

It is necessary to provide, during the treatment, an intimate contact of the ester with the water or the neutralizing solution, this being accomplished by means of a stirrer, a pump or any other adequate means.

The minimum duration of the heat treatment depends upon the kind of ester treated and the temperature of treatment.

Thus, for example, octyl phthalate shoudl be subjected to the heat treatment for at least 165 minutes at 150° C., or 90 minutes at 160°, or 60 minutes at 170° C.

The product thus treated, after separation from water, washing for removal therefrom of dissolved neutralizing substance, then drying, may later on be heated to a high temperature without developing color nor acidity.

The process of this invention may be applied generally to any and all plasticizers produced by esterification of an alcohol, glycol or polyol with an acid or acid anhydride, for example butyl, octyl or nonyl phathalates or adipates, triethylene glycol dihexanoic ester, and the like.

For each ester plasticizer the optimum conditions of time and temperature to be applied may be different, but it may be said generally that the temperature should be chosen within the range of 70–180° C. and the time during which the heating, in combination with the other means disclosed, is applied may be of from 30 minutes to 5 hours.

The heat treatment may be applied either to the finished ester, that is, after separation therefrom of excess alcohol, water entrainer if any and catalyst employed by the esterification reaction, or to the ester at a stage of its production (more particularly, immediately after the esterification reaction), in the presence of water entrainer, if any, water, catalyst and excess alcohol or acid; in that case, the presence of the catalyst and the excess acid, if any, should be taken into account in the determination of the amount of diluting and/or neutralizing agent to be used.

The indications given above respecting the temperature and time of treatment concern batch treatment of ester plasticizers. The treatment, however, may be carried out continuously in an apparatus adapted to continuously insure intimate contact between the two phases.

The accompanying drawings forming part of this application diagrammatically show two devices which may be employed to carry out this invention.

In the case of Fig. 1, the heat treatment zone consists of a pipe 1, part of which constitutes one of the elements of a heat exchanger, the other element of which is a heating pipe 2 through which steam flows as shown by the arrows. Pipe 1 belongs to a circuit including a pump 3 causing high speed circulation and turbulence of the mixture of ester to be treated, introduced through pipe 4, and treatment agent, introduced through pipe 5 just upstream of a pump 6 which feeds the circuit.

After leaving the circuit at a rate corresponding to the feed, the reaction mixture passes through a cooler 7, then flows to a decanter 8 where the ester is separated from the treatment agent. The ester is withdrawn through pipe 9, and the agent through pipe 10.

The apparatus of Fig. 2 differs from that of Fig. 1 in that the circuit, 1–3, is replaced by a tower 11 containing filling material and enveloped by a heating jacket 12.

In continuous operation, for a given temperature the time of sojourn in the apparatus will vary according to the mode of operation and will be determined, for each particular case, by applying the general formulae of chemical kinetics.

The preferred conditions for the carrying out of this invention are the treatment of the raw product of the esterification reaction and the use of a sodium carbonate aqueous solution as a treatment agent. This aqueous solution causes direct neutralization of the esterification catalyst, whereas if water only is used for treating the raw esterification mixture, subsequent neutralization of the catalyst dissolved in the water is also necessary. As said above, it is possible to use sodium hydroxide or other caustic alkali, but the operation is delicate because of the risk, under certain conditions, of causing partial saponification of the ester plasticizer treated. That is why the use of sodium carbonate is preferred.

Before giving examples illustrating this invention, we describe below the three tests referred to in the following examples.

1.—*Acidity test.*—Acidity in millimolecules per liter of the ester plasticizer is determined before and after a two-hours' heating at 160° C.

2.—*Color test.*—Color is determined by means of Lovibond tintometer with a 6-inch cell, before and after a 15-minutes' heating at 180° C.

3.—*Paper test.*—A filter paper is immersed for one hour in a sample of the ester heated at 180° C., then the color of the paper is determined by means of the Lovibond tintometer, by reflection.

Example 1

500 milliliters of octyl phthalate having the following characteristics:

Acidity test: before heating, 0.27; after heating, 3.5
Color test: before heating, 0.4 Yellow+0.1 Red; after heating, 4.9 Yellow+1.1 Red
Paper test: 8.5 Yellow+7 Red+9 Blue were heated for 165 minutes at 150° C., under stirring, in a closed, tight vessel, with 100 milliliters of 10% aqueous solution of sodium carbonate.

The treated phthalate was then separated by decantation, washed with warm water and dried by passing warm air therethrough. After treatment, its characteristics were as follows:

Acidity test: before heating, 0.2; after heating, 0.8
Color test: before heating, 0.4 Y+0.1 R; after heating, 0.4 Y+0.1 R
Paper test: 0.6 Y+0.3 R

Example 2

500 milliliters of the same octyl phthalate as in Example 1 were heated for 90 minutes at 160° C., under stirring, with 50 milliliters of normal aqueous sodium hydroxide. After water washing and drying, the characteristics were as follows:

Acidity test: before heating, 0.14 after heating, 0.75
Color test: before heating, 0.4 Y+0.1 R; after heating, 0.5 Y+0.1 R
Paper test: 0.8 Y+0.5 R It was found that 3.5% by weight of the octyl phthalate treated was saponified.

Example 3

The same mixture as in Example 1 was heated for one hour at 170° C., under stirring. After water washing and drying, the characteristics of the ester were as follows:

Acidity test: before heating, 0.12; after heating, 0.8
Color test: before heating, 0.5 Y+0.1 R; after heating, 0.6 Y+0.1 R
Paper test: 0.6 Y+0.3 R

Example 4

Octyl phthalate to be stabilized had the following characteristics:

Acidity test: before heating, 0.25; after heating, 5
Color test: before heating, 1.7 Y+0.6 R; after heating, 15 Y+3 R
Paper test: black 500 milliliters of this ester were mixed, under stirring, with 500 milliliters of water and the mixture was heated and stirred in an autoclave for 3 hours at 150° C. Then, the mixture was decanted and the ester layer dried. The characteristics of the treated ester were as follows:

Acidity test: before heating, 0.2; after heating, 2.2
Color test: before heating, 1.4 Y +0.1 R; after heating, 2 Y+0.2 R
Paper test: 0.8 Y+0.3 R

Example 5

At the exit point of a continuous esterification apparatus there was obtained a mixture containing, by weight, 86% octyl phthalate, 13% octyl alcohol and 1% benzene. 360 liters per hour of this mixture, together with 70 liters per hour of 15% aqueous solution of sodium carbonate, were introduced into a treatment circuit of 1430 liters capacity, maintained at 175° C. The phthalate leaving the circuit was decanted, washed with warm water, steam-distilled in a distillation column for removal of the alcohol and the benzene, and finally dried with warm air in a tower filled with Raschig rings. The so-treated phthalate showed a paper test of 0.6 Y+0.2 R, while if the heating step at 175° C. be omitted, the paper test was 6 Y+3 R.

Example 6

The starting material was octyl adipate produced from adipic acid and excess octyl alcohol in the presence of sulfuric acid. The characteristics of the ester were as follows:

Acidity test: before heating, 0.6; after heating, 5.1.
Color test: before heating, 21 Y+4.2 R; after heating, 22 Y+5 R
Paper test: black The ester was heated for 30 minutes at 170° C. with an equal volume of water, then neutralized with sodium carbonate, washed and dried. The characteristics of the treated ester were as follows:

Acidity test: before heating, 0.15; after heating, 1.75
Color test: before heating, 15 Y+2.4 R; after heating, 15 Y+3 R
Paper test: 6 Y+3 R Should the heat treatment time be one hour instead of 30 minutes, the characteristics of the ester would become as follows:

Acidity test: before heating, 0.15; after heating, 1.25
Color test: before heating, 10 Y+2 R; after heating, 10 Y+2 R
Paper test: 2 Y+0.5 R

Example 7

The starting material was the raw product of esterification of phthalic anhydride by butyl alcohol, containing 80% by weight of butyl phthalate and 20% by weight of butyl alcohol, and containing in addition the acid esterification catalyst.

If this raw product was only neutralized cold by stirring for 10 minutes 500 ml. thereof with 100 ml. of 10% aqueous solution of sodium hydroxide, then decanted, washed, separated from the excess alcohol and dried, the characteristics of the ester would be the following:

Acidity test: before heating, 0.15; after heating, 4.5
Color test: before heating, 0.7 Y+0.2 R; after heating, 1 Y+0.5 R
Paper test: black On the other hand, if, in accordance with this invention, 500 ml. of the raw product are heated for 4 hours at 80° C. with 100 ml. of 10% aqueous solution of sodium carbonate, the characteristics become as follows:

Acidity test: before heating, 0.1; after heating, 2
Color test: before heating, 0.6 Y+0.3 R; after heating, 0.6 Y+0.3 R
Paper test: 1.4 Y+0.6 R If the heating step is carried out for one hour at 130° C., the characteristics are as follows:

Acidity test: before heating, 0.15; after heating, 1.5
Color test: before heating, 0.3 Y+0.1 R; after heating, 0.3 Y+0.1 R
Paper test: 1 Y+0.2 R

*Example 8*

Triethylene glycol di-2:ethylhexanoic ester to be stabilized had the following characteristics:

Acidity test: before heating, 5; after heating, 12
Color test: before heating, 6 Y+1.1 R; after heating, 11 Y+2.1 R
Paper test: black 500 ml. of this ester were heated for one hour at 130° C., under stirring, with 100 ml. of 10% aqueous solution of sodium carbonate. After water washing and drying, the characteristics were as follows:

Acidity test: before heating, 2; after heating, 6
Color test: before heating, 2 Y+0.3 R; after heating, 2 Y+0.3 R
Paper test: 0.6 Y+0.2 R Another sample of 500 ml. of the same starting ester was subjected to the same treatment, but at a temperature of 115° C. for 80 minutes. The characteristics of the final product were as follows:

Acidity test: before heating, 1.6; after heating, 4.75
Color test: before heating, 1.4 Y+0.2 R; after heating, 1.5 Y+0.2 R
Paper test: 0.5 Y+0.2 R

We claim:
1. A process which comprises heating a plasticizer ester containing a catalyst-acid-ester-impurity with an aqueous solvent at about 70–180° C. for about 30 minutes–5 hours, whereby the impurity is inactivated without substantial decomposition of the plasticizer ester, and separating the plasticizer ester from said impurity.

2. A process which comprises continuously flowing in a zone a mixture of a plasticizer ester containing a catalyst-acid-ester-impurity and an aqueous solvent, heating the mixture to about 70–180° C. for about 30 minutes–5 hours, whereby the impurity is inactivated without substantial decomposition of the plasticizer ester, and continuously separating the plasticizer ester from the impurity.

3. A process which comprises heating octylphthalate containing a catalyst-acid-ester-impurity with an aqueous solution of sodium carbonate at about 70–180° C. for about 30 minutes–5 hours, whereby the impurity is inactivated without substantial decomposition of said octylphthalate, and separating the octylphthalate from the impurity.

References Cited in the file of this patent

UNITED STATES PATENTS

| | | |
|---|---|---|
| 1,993,737 | Graves et al. | Mar. 12, 1935 |
| 2,147,488 | Hickman et al. | Feb. 14, 1939 |
| 2,494,133 | Jeffs | Jan. 10, 1950 |
| 2,653,165 | Levine | Sept. 22, 1953 |
| 2,699,434 | Turck | Jan. 11, 1955 |